Nov. 9, 1965   R. W. KING ETAL   3,216,651
SEAL
Filed July 1, 1963   4 Sheets-Sheet 1

INVENTORS
ROBERT W. KING
RAYMOND T. LAW
WILLIAM W. VOGELHUBER
BY Gray, Mase, and
Dunson, Attorneys Nov. 9, 1965 R. W. KING ETAL 3,216,651
SEAL
Filed July 1, 1963 4 Sheets-Sheet 2

INVENTORS
ROBERT W. KING
RAYMOND T. LAW
WILLIAM W. VOGELHUBER
BY *Gray, Mase, and Dunson,* Attorneys INVENTORS
ROBERT W. KING
RAYMOND T. LAW
WILLIAM W. VOGELHUBER
BY *Graf, Mase, and Dunson,* Attorneys Nov. 9, 1965 R. W. KING ETAL 3,216,651
SEAL
Filed July 1, 1963 4 Sheets-Sheet 4

INVENTORS
ROBERT W. KING
RAYMOND T. LAW
WILLIAM W. VOGELHUBER
BY Gray, Mase, and
Dunson, Attorneys United States Patent Office 3,216,651
Patented Nov. 9, 1965

3,216,651
SEAL
Robert W. King, Newark, Raymond T. Law, Worthington, and William W. Vogelhuber, Columbus, Ohio, assignors, by mesne assignments, to The Battelle Development Corporation, Columbus, Ohio, a corporation of Delaware
Filed July 1, 1963, Ser. No. 291,778
8 Claims. (Cl. 230—56)

This invention relates to seals for reciprocating parts. More particularly, it relates to a composite seal for preventing leakage around the reciprocating parts while they are moving as well as when they are static.

Although the seal of this invention may be used separately on any reciprocating shaft, it may also be combined with a reverse-leakage seal of the type described in U.S. Patent No. 3,146,940. Therefore, for convenience, the description that follows is directed toward the seal of this invention being used with a reverse-leakage seal.

Some refrigeration systems can be hermetically sealed to prevent leakage of the refrigerant during operational or nonoperational periods. When a free-piston compressor having a piston rod connection between the combustion piston and compressor piston is used in a refrigeration system, certain problems arise in keeping the refrigerant from leaking out of the system. Leakage cannot be completely eliminated but can be reduced to a point such that the free-piston compressor system becomes feasible. The leakage takes place along the rod connecting the combustion piston and the compressor piston. This leakage must be eliminated both during static and dynamic operation of the piston rod. The reverse-leakage seal principle works well during operation, because of differential pressures developed by the reciprocating parts, but must be supplemented during shutdown periods. During shutdown, these pressures are changed so that the reverse-leakage seal is nonoperative.

In a free-piston engine, sealing of the refrigerant with the reverse-leakage seal is accomplished by providing a sealing liquid in a gland between the refrigerant and engine sections. By maintaining the liquid in the gland at pressures greater than those of either the refrigerant or the air on the sides of the gland, the leak paths are sealed by the liquid. The sealing problem is then largely reduced to that of sealing a liquid rather than directly sealing the refrigerant vapor. The term "reverse-leakage seal" refers to the leakage of the liquid through leak paths in a direction reversed to that of the refrigerant or air leakages.

Although the direct loss of refrigerant is prevented by the reverse-leakage seal, an indirect leakage of refrigerant still may occur. The gland liquid contains a certain amount of dissolved refrigerant, when the gland liquid is oil, from the refrigerant system that has been exposed to the refrigerant in the high pressure of the refrigerant system. A certain amount of the oil, in the form of a film, adheres to the piston rod connection, passes outside the gland and is exposed to the air. Although very little or no oil may be lost due to this film, the dissolved refrigerant in the film can escape while the film is outside of the gland because of the difference in the partial pressure of the refrigerant in the oil film and the environment outside the gland. As the film re-enters the gland, it comes into intimate contact with the oil in the gland, absorbs more refrigerant and the cycle is repeated. Refrigerant loss becomes a function of a number of factors, among which are: film area, film thickness, concentration of refrigerant in the gland liquid, and the pressure of the refrigerant in the chamber adjacent to the gland. During shutdown, a static seal is required to prevent refrigerant leakage from the refrigerant section and oil from the gland. A portion of the seal construction described herein is responsible for minimizing the thickness of the oil film on the piston rod during reciprocation.

This invention includes a composite seal for a reciprocating part comprising: a liquid-filled chamber surrounding the reciprocating part, at least one sealing member positioned on each side of the liquid-filled chamber for minimizing liquid loss along the reciprocating part during reciprocation, and means for sealing off the liquid-filled chamber during periods when the reciprocating part is static.

One advantage of this invention is that the static seal is inactive during reciprocation of the compressor piston rod and therefore not subject to wear. Another advantage is that the dynamic seals are constructed so that the oil film on the piston rod is maintained to provide seal lubrication after a prolonged period of operation and furthermore, the presence of seal wear (up to a given point) will act to reduce refrigerant and oil leakage. Still other advantages will be apparent from the accompanying drawings, the description that follows and the claims herein set forth.

Figure 1:
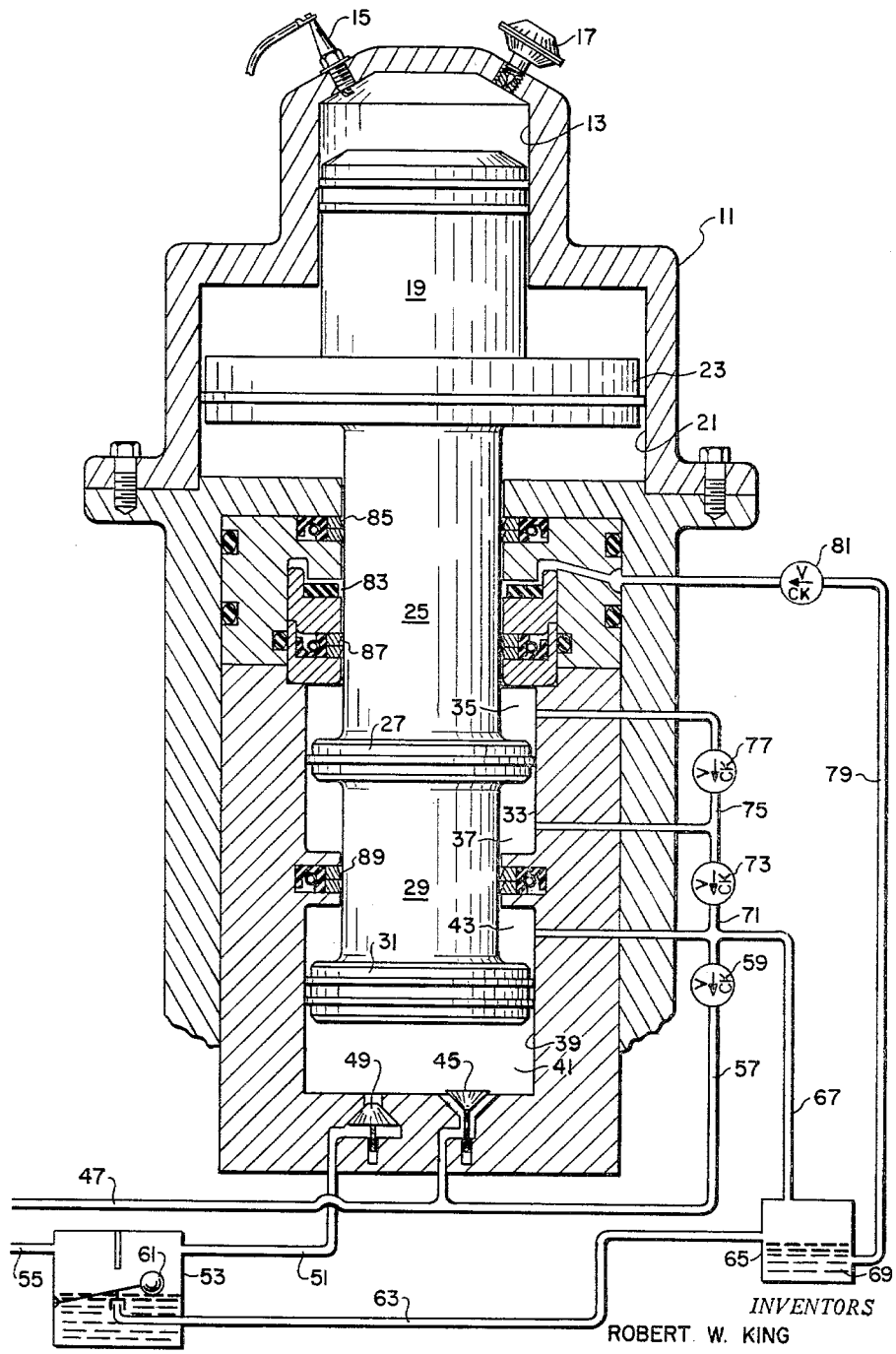
FIG. 1 is a diagrammatic, general view of a free-piston engine compressor having a reverse-leakage seal and showing an embodiment of the static seal of this invention.

In the drawings, the same reference numerals are applied to identified parts in all embodiments and such identically numbered parts are substantially identical in structure, function, and operation. Therefore, to eliminate confusing duplication, these parts, their interrelationship and their function will be described in conjunction with a single embodiment, such description applying to all embodiments where these parts appear.

Referring to FIG. 1, a free-piston engine compressor 11 is shown having a combustion cylinder 13 in which are inserted a spark plug 15, gas injection valve 17, and other controls (not shown) making up the power section of the free-piston compressor 11. A power piston 19 is positioned in the combustion cylinder 13. Adjacent to the combustion cylinder 13 is a larger control cylinder 21, in which is located a control piston 23. The control cylinder 21 and piston 23 provide air for scavenge and combustion and also provide rebound energy for reciprocation of the free piston.

The remaining portion of FIG. 1 that extends below the control cylinder 21 is a diagram of the compressor system and is shown to indicate the relative location of the various parts and to illustrate the operation of the reverse-leakage seal. A piston rod section 25 connects the control piston 23 with a pumping piston 27. The pumping piston is connected by piston rod 29 to the compressor piston 31. The pumping piston 27 operates in a pumping cylinder 33 which is divided by the pumping piston 27 into a third stage refrigerant stripper chamber 35 and a second stage refrigerant stripper-chamber 37. The compressor piston 31 operates in the compressor cylinder 39 and divides the compressor cylinder 39 into a compressor chamber 41 and a first stage refrigerant stripper chamber 43.

On the expansion or outward stroke of the compressor piston 31 refrigerant gas enters the compressor chamber 41 through inlet valve 45 from a supply line 47 which is connected to a condenser (not shown). On the compression or inward stroke of the compressor piston 31, the refrigerant gas is compressed and forced through outlet valve 49 into a high pressure line 51 then passes through an oil separator 53 and into a line 55 that leads to an evaporator (not shown). Assuming, for purposes of description that the compressor unit described herein is a unit of approximately three tons capacity, the inlet supply line pressure would ordinarily be 84 p.s.i.a. and the compressed refrigerant would reach a pressure of between 240 to 325 p.s.i.a. The pressures given herein can, of course, be varied according to the capacity desired from the unit and are merely stated to indicate the relative pressures in the various chambers in order to aid in describing the operation of the reverse-leakage seal principle. The first stage refrigerant stripper chamber 43 is connected by means of a line 57 to the supply line 47 of the refrigerant system. A check valve 59 is provided in the connection line 57 so that the fluids in the first stage stripper chamber are allowed to flow only toward the supply line 47. This means that the pressure in the first stage stripper chamber 43 will never be higher than the pressure of the inlet pressure line and check valve spring which is approximately 84 p.s.i.a. This high pressure condition will prevail when the compressor piston 31 is traveling on the outward stroke. At this time the fluids in the first stage stripper chamber 43 will be passing through the line 57 toward the supply line 47. However, on the inward stroke of compressor piston 31 check valve 59 will be closed, the fluids in the first stage stripper chamber 43 will be expanded, the pressure will be reduced to a value lower than 84 p.s.i.a., and will eventually reach a pressure of approximately 45 p.s.i.a. The oil separator 53 has a float-type check valve 61 that opens and closes a line 63 leading to an oil reservoir 65. The oil reservoir 65 is connected by a line 67 to the first stage stripper chamber 43 and consequently the pressure of the gas above the oil 69 in the reservoir 65 is maintained at an average value of 55 p.s.i.a. The first stage stripper chamber 43 is connected to the second stage stripper chamber 37 by means of line 71 which contains a check valve 73. The check valve 73 allows the fluids in the second stage stripper chamber 37 to flow only in one direction, that is, from the second stage stripper chamber 37 to the first stage stripper chamber 43. Since the check valve 73 allows the fluid to pass only in one direction this means that the highest pressure obtainable in the second stage stripper chamber will be 45 p.s.i.a., and this condition will exist when the pumping piston 27 is on the inward stroke forcing the fluid from second stage stripper chamber 37 through the connection line 71 into the first stage stripper chamber 43. When the pumping piston 27 is traveling on the outward stroke, the check valve 73 will be closed and the fluids in the second stage stripper chamber 37 will be expanding and will be reduced to a value of about 22 p.s.i.a. A connecting line 75 having a check valve 77 is also provided between second stage stripper chamber 37 and third stage stripper chamber 35. The check valve 77 allows the gas to flow only in one direction which is from the third stage stripper chamber 35 to the second stage stripper chamber 37. The fluids from the third stage stripper chamber 35 will pass through the connection line 75 into the second stage stripper chamber 37 when the pumping piston 27 is on the outward stroke. The highest pressure obtainable in the third stage stripper chamber will be the lowest value of the second stage stripper chamber, that is, 22 p.s.i.a. When the pumping piston 27 is on the inward stroke, the fluids in third stage stripper chamber 35 will be expanded since check valve 77 will be closed, and the fluids within the third stage stripper chamber will reach a value of about 7 p.s.i.a. Oil is supplied from the oil reservoir 65 through a line 79 containing a check valve 81 to an oil gland 83 located between the third stage stripper chamber 35 and the control cylinder 21. Since this oil is obtained from the oil reservoir 65, which is maintained at a pressure of approximately 55 p.s.i.a and the third stage stripper chamber is maintained at a pressure between 7 and 22 p.s.i.a., the oil has a tendency to leak from the oil gland 83 toward the third stage stripper chamber 35. A certain amount of gas will be dissolved in the oil. This gas was dissolved in the oil at a pressure of approximately 55 p.s.i.a. Therefore, when the oil reaches the third stage stripper chamber, which has a pressure of about 7 to 22 p.s.i.a., the refrigerant gas in the oil will have a tendency to "boil off." This refrigerant is then pumped down through the various stages of the stripper chambers into the compressor chamber.

A series of dynamic seals are located in the compressor. The first dynamic seal 85 is located between the oil gland 83 and the control cylinder 21. The second dynamic seal 87 is located between the oil gland 83 and the third stage stripper chamber 35. The third dynamic seal 89 is located between the second stage stripper chamber 37 and the first stage stripper chamber 43.

Figure 2:
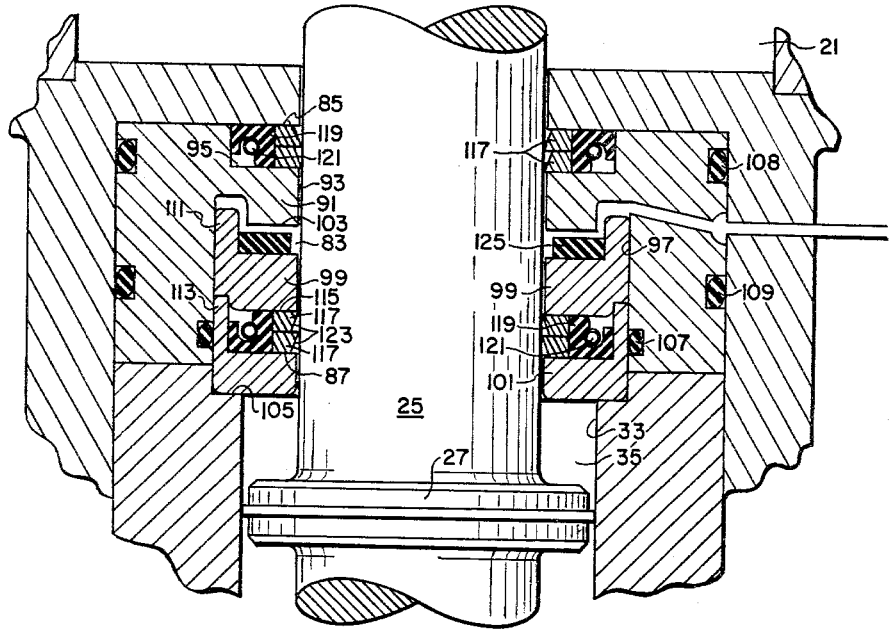
FIG. 2 is a sectional view of one embodiment of the static seal positioned for operation of the compressor.
Figure 3:
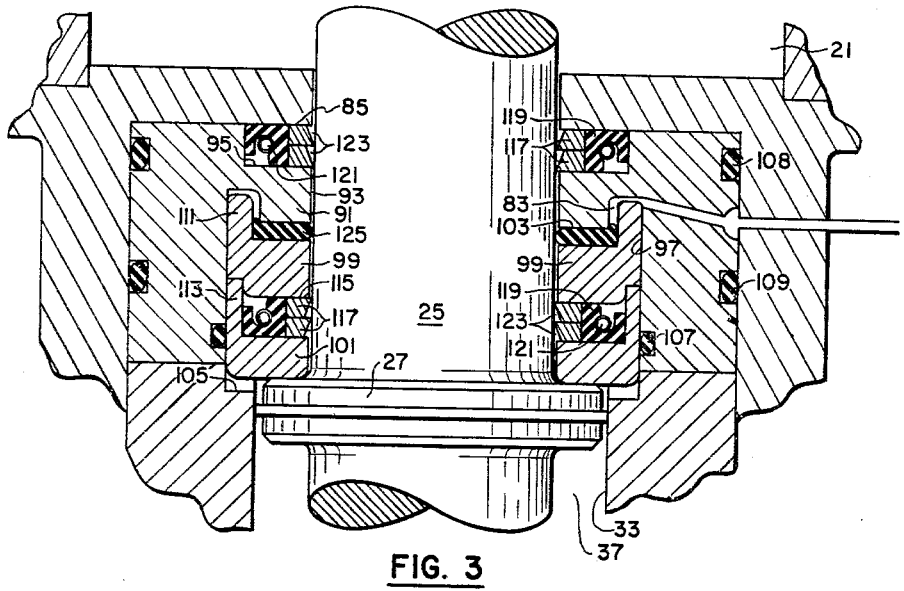
FIG. 3 is a sectional view of the embodiment of the seal shown in FIG. 2 with the static seal positioned for shutdown of the compressor.

FIGS. 2 and 3 are sectional views of the seal area showing different positions of one embodiment of the static seal. In the seal area, an annular ring 91 having a central bore 93 encircles the piston rod 25. At the end of the annular ring 91, that is nearest the control chamber 21, a seal groove 95 is formed in bore 93 and contains dynamic seal 85. The opposite end of annular ring 91 has a larger bore 97 in which are fitted two sleeves 99 and 101 that fit closely around the piston rod 25 and are slidable within bore 97. A chamber, referred to as the oil gland 83, is formed between sleeve 99 and the end 103 of bore 97. The pressure of the oil in oil gland 83 (during compressor operation) forces sleeves 99 and 101 against a seat 105 formed around the inside end of third stage stripper chamber 35. An O-ring 107 is provided in bore 97 to seal the oil gland 83 and prevent leakage around the outside diameter of sleeve 101. Leakage from the oil gland 83 around the outer surface of annular ring 91 is prevented by O-rings 108 and 109 positioned above and below oil gland 83. Sleeves 99 and 101 each have an extension or rim 111 and 113, respectively, that provide a surface of contact against the inner surface of bore 97. The rim 113 spaces sleeve 101 from sleeve 99 to form a seal groove 115 that contains dynamic seal 87.

Each dynamic seal 85 and 87 (and 89 shown in FIG. 1) includes two metallic contracting rings 117—117 backed up by an elastomeric lip-type seal 119 and a metallic garter spring 121. The face 123 of each contracting ring 117 is tapered to about a ¾ degree angle (this angle is exaggerated in the drawings to make it apparent). The apex of the angle on each ring face of dynamic seals 85 and 87 points toward the oil gland 83. This tapered face 123 on contracting rings 117—117 of dynamic seal 85 provides a scraping action on the surface of the piston rod 25 reducing the thickness of the exposed oil film during the outward movement of the piston rod 25 from the gland 83. During inward movement, due to the taper on the face 123, a hydrodynamic oil pressure builds up at the ring faces 123—123. Since each ring is split at one point a hydrodynamic pumping action occurs that carries the oil from the oil film back to the oil gland 83. The elastomeric lip seal 119 seals the outer diameter of the rings 117—117 and especially at the point where each of the rings 117—117 are split (not shown). The lip seals 119—119 also provide a seal around the ring grooves 95 and 115. The garter springs 121—121 load the rings 117—117 sufficiently so that a seal is maintained at the contact surfaces between the rings 117—117, the elastomer 119, and the piston rod 25. This loading also takes care of whatever wear may occur at the contact surfaces. Dynamic seal 87 operates the opposite of dynamic seal 85, that is, it provides a scraping action on the inward movement of the piston rod 25 and a hydrodynamic pumping action on the outward movement of piston rod 25 thus maintaining a majority of the oil in the gland 83. Preferably the rings 117—117 are constructed of a pearlite-type cast iron for the best sealing and wearing rates.

The static seal functions when the compressor 11 shuts down. Since the pressure in the compressor chamber 41 (see FIG. 1) is always higher than the combustion chamber pressure when the combustion engine portion is shut down, the pressure in the compressor chamber 41 forces the piston 31 outward towards the top of the compressor cylinder 39. This causes piston 27 to move in the same direction until it engages sleeve 101. This position of the piston 27 is shown in FIG. 3 as piston 27 pushes sleeve 101 against sleeve 99 until sleeve 99 squeezes a resilient seal ring 125 positioned in the oil gland 83. The pressure in the compressor chamber 41 applies enough force to piston 31 and consequently to piston 27, so that piston 27 displaces rings 101 and 99 squeezing the seal ring 125 and seal ring 125 contacts the sleeve 99, the end 103 of bore 97 and the piston rod 25, sealing off the oil gland 83 from the surface of piston rod 25. The refrigerant gas and oil are prevented from leaking toward the control cylinder 21 by lip seal 119 of dynamic seal 87, O-ring 107, O-ring 109, O-ring 108, and the squeezed static seal ring 125. The oil of gland 83 is prevented from leaking toward the third stage stripper chamber 35 by O-ring 109, squeezed static seal ring 125, O-ring 107 and lip seal 119 of dynamic seal 87. The resilient static seal ring 83 is preferably molded from a silicone rubber compound.

Figure 4:
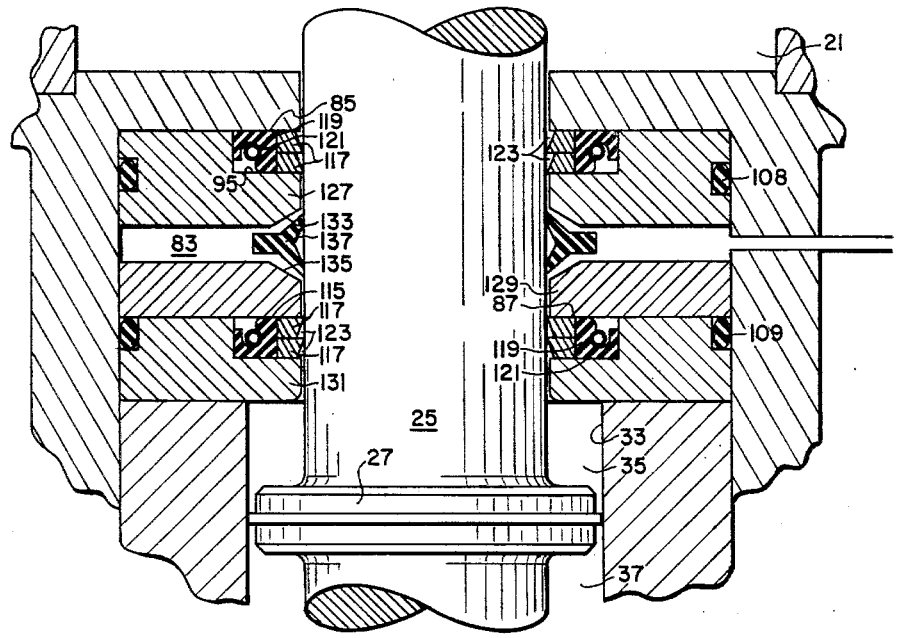
FIG. 4 is a sectional view of a second embodiment of the static seal with the seal positioned for operation of the compressor.
Figure 5:
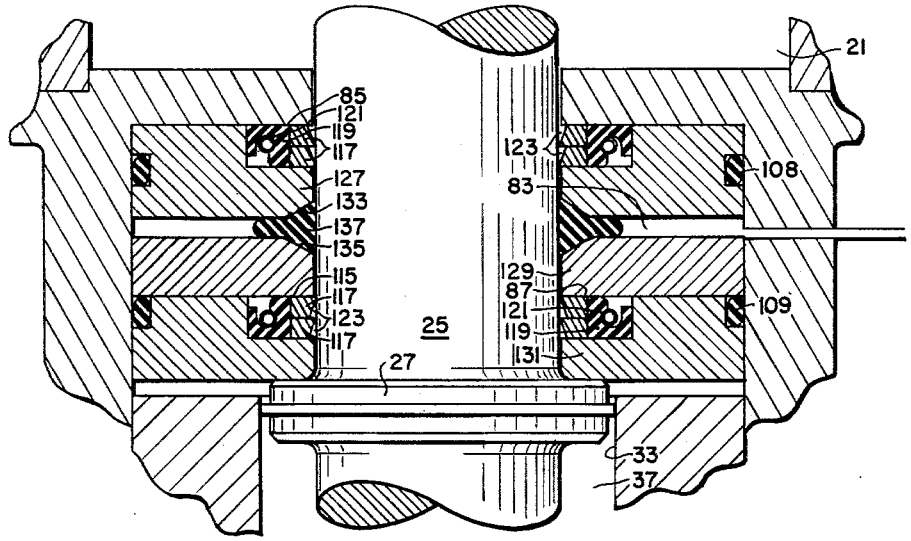
FIG. 5 is a sectional view of the seal shown in FIG. 4 positioned for shutdown of the compressor.

FIGS. 4 and 5 show another configuration of a static seal. FIG. 4 shows a seal in the position that it occupies while the compressor 11 is operating. There are three annular rings 127, 129, and 131 constructed to fit closely around the piston rod 25. Annular ring 127 is fixed to the end of the control chamber 21, is provided with the O-ring 108, and has the seal groove 95 formed therein that contains dynamic seal 85. The oil gland 83 is formed between annular rings 127 and 129. Annular rings 129 and 131 are both slidable and are both forced against the ends of cylinder 33 by the oil pressure of oil gland 83 during compressor operation. Annular ring 131 is provided with the O-ring 109 and seal groove 115, which contains dynamic seal 87. The annular ring 127 has a chamfer 133 around the corner next to the oil gland 83 and piston rod 25. In like manner the annular ring 129 has a chamfer 135 around the corner next to the oil gland 83 and piston rod 25. A resilient seal ring 137, which is Y-shaped in cross section, is positioned in the oil gland 83. The Y-shaped cross section of seal 137 allows the ring to be fit closely to the surfaces of the oil gland 83 that are near the piston rod 25 but with sufficient clearance to allow the oil to pass around the seal ring 137 and reach the surface of piston rod 25. The seal ring 137 is large enough in diameter so that there is a small clearance space between its inside diameter and the surface of the piston rod 25. The magnitude of the sealing force is determined by the angle formed between the seal and the chamfer surfaces 133 and 135. Further seal force control is afforded by the dimensioning of the outer thickness of the seal ring, thus causing the seal to "bottom out."

FIG. 5 shows the resilient seal ring 137 in the squeezed position after the compressor 11 has been shut down and the piston 27 has forced the annular rings 129 and 131 toward the oil gland 83 and against the seal ring 137. In this position oil and refrigerant are prevented from leaking toward the control chamber 21 by seal ring 137, O-ring 108 and dynamic seal 85 and is prevented from leaking toward the third stage stripper chamber 35 by seal ring 137, O-ring 109 and dynamic seal 87. The seal ring 137 is preferably fabricated from a plastic material such as Teflon.

Figure 6:
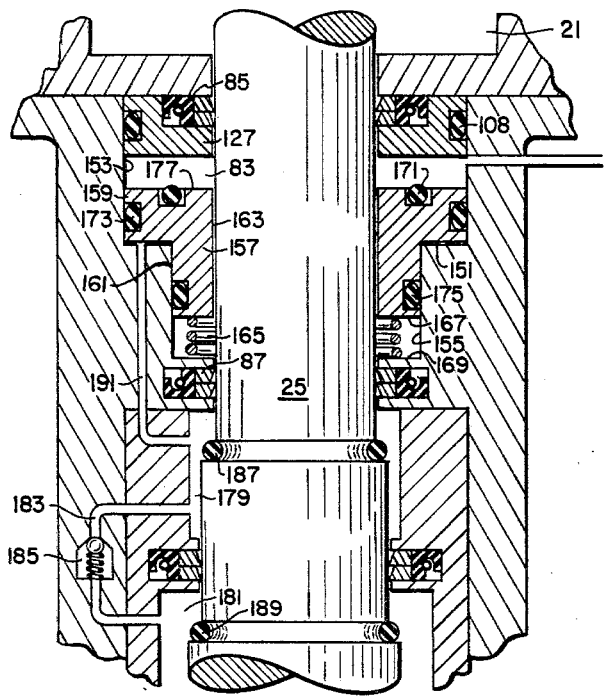
FIG. 6 is a sectional view of a third embodiment of the static seal positioned for operation of the compressor.

FIG. 6 shows still another construction for sealing the oil gland 83 during compressor shutdown. Dynamic seals 85 and 87 occupy the same positions around the piston rod 25 on each side of the oil gland 83 as shown in the embodiments of FIGS. 2 and 3 and FIGS. 4 and 5. Dynamic seal 85 is positioned in the annular ring 127 which also has the O-ring 108 around its outside diameter. Between the dynamic seals 85 and 87 is a cylinder 151 having a major diameter portion 153 and a minor diameter portion 155. A piston 157, also having a major diameter portion 159 and a minor diameter portion 161 is slidably positioned in cylinder 151. Piston 157 has a central bore 163 that is large enough to provide a small clearance between the piston rod 25 and piston bore 163. A spring 165 is positioned between one end 167 of piston 157 and the bottom 169 of cylinder 151 and urges the piston 157 toward the annular ring 127. The piston 157 is maintained in a spaced position from annular ring 127 by the pressure of the oil from the compressor to form a chamber or oil gland 83. The piston 157 supports three O-rings 171, 173, and 175. O-ring 171 is located in the surface of the end 177 of piston 157 encircling the piston rod 25, O-ring 173 is positioned around the outer surface of greater diameter portion 159 of piston 157, and O-ring 175 is placed around the outside surface of minor diameter portion 161 of piston 157.

Figure 7:
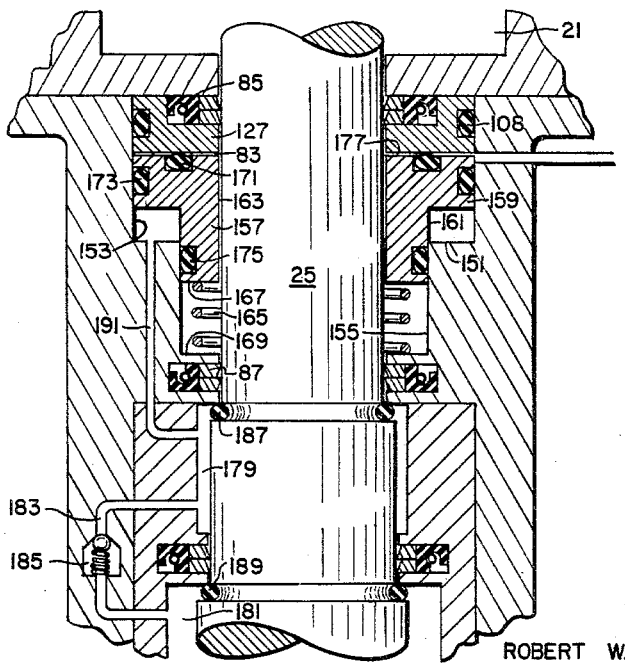
FIG. 7 is a sectional view of the embodiment of the seal shown in FIG. 6 positioned for shutdown of the compressor.

In this particular application, only a second-stage stripper chamber 179 and a first-stage stripper chamber 181 are used. The second-stage stripper chamber 179 is connected to the first stage stripper chamber 181 by a duct 183 having a check valve 185. The first-stage stripper chamber 181 of FIG. 6 operates identical to the first-stage stripper chamber 43 shown in FIG. 1. Two O-rings, 187 and 189, are positioned around the piston rod 25 and, as shown in FIG. 7, are pressed against the ends of stripper chambers 179 and 181 to seal them when the compressor 11 is shut down. There is also a duct 191 that communicates between the second-stage stripper chamber 179 and the large diameter portion 153 of chamber 151.

While the compressor 11 is operating, the oil pressure in gland 83 maintains a space between annular ring 127 and the end 177 of piston 157 (shown in FIG. 6) and this space actually forms the oil gland 83. The space between the outer surfaces of piston 157 and the surfaces of cylinder 151 are sealed by O-rings 173 and 175. When the compressor 11 is shut down, the piston rod 25 is pushed outward by the force of the compressor gas and the seals 187 and 189 engage the end of the stripper chambers 179 and 181, respectively (FIG. 7). At the same time, the oil pressure in gland 83 drops off and the spring 165 moves the piston 157 until the O-ring 171 engages the end of annular ring 127. The oil is then prevented from leaking toward the control chamber 21 by O-ring 171 and O-ring 108 and from leaking toward stripper chamber 179 by O-ring 173 and O-ring 171. The refrigerant gas is prevented from leaking around the piston rod 25 by O-rings 187 and 189. Duct 191 provides pressure relief between the greater diameter piston 159 in greater diameter cylinder 153 allowing the piston 157 to move back and forth without generating pressure differentials in the space beneath the greater diameter piston 159. During shut down the gas communicating from stripper chamber 179 to major diameter cylinder 153 through duct 191 is prevented from leaking toward the cylinder 153 by O-rings 173 and 175.

The resilient rings 125 and 137 (shown in FIGS. 2 and 3 and FIGS. 4 and 5) were squeezed indirectly by the residual compressor gas acting through piston 27. These resilient rings 125 and 137 may also be squeezed by a spring similar to spring 165 in FIGS. 6 and 7. Such a spring would be positioned to force the annular rings (99 and 101 or 129 and 131) against the resilient ring 125 or 137.

The general configuration for the composite seal described herein may be summarized as: a liquid-filled chamber 83 surrounding the piston rod 25, a sealing member 85–87 on each side of the liquid-filled chamber 83, each sealing member 85–87 being positioned closely around the piston rod 25 thereby minimizing leakage of liquid from the liquid filled chamber 83 during reciprocation of the piston rod 25, a resilient member (83, 137, or 171) disposed in the liquid-filled chamber and surrounding the piston rod 25, and a movable member (99, 129 or 157) positioned to engage and compress the resilient members (183, 137 or 171) sealing off the liquid-filled chamber 83 after the compressor 11 is shut off with the movable members (99, 129, or 157) being activated by the pressure changes in the compressor 11 after it is shut off.

It will be understood, of course, that, while the forms of the invention shown and described constitute the preferred embodiments of the invention, it is not intended to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein disclosed.

What is claimed is:

1. A composite seal for a reciprocating part, comprising:
    (a) a liquid-filled chamber surrounding the reciprocating part, said liquid-filled chamber having a movable wall for reducing the size thereof;
    (b) at least one sealing member on each side of said liquid-filled chamber for minimizing oil loss along the reciprocating part during reciprocation;
    (c) a resilient member positioned in said liquid-filled chamber and surrounding the reciprocating part; and
    (d) engagement means supported by the reciprocating part and positioned thereon for contacting said movable wall at a maximum terminal position of said reciprocating part repositioning said movable wall to compress said resilient member thereby sealing off said liquid-filled chamber from the reciprocating part, said maximum terminal position of said reciprocating part occurring when said reciprocating part is static.

2. A composite seal for a reciprocating rod, comprising:
    (a) an oil-filled chamber surrounding the reciprocating rod, said oil-filled chamber having a movable wall for reducing the size thereof;
    (b) a sealing member on each side of said oil-filled chamber, each said sealing member being positioned closely around the reciprocating rod thereby removing oil from the surface of the reciprocating rod during reciprocation thereof;
    (c) a resilient member positioned in said oil-filled chamber and surrounding the reciprocating rod; and
    (d) an enlargement on the reciprocating rod positioned to engage said movable wall at a maximum terminal position of the reciprocating rod and thereby reposition said movable wall to compress said resilient member and seal off said oil-filled chamber from the reciprocating rod, said maximum terminal position of the reciprocating rod occurring when the reciprocating rod becomes static.

3. In a free-piston-engine compressor having a reciprocating piston rod, a composite seal comprising:
    (a) a liquid-filled chamber surrounding the piston rod;
    (b) a sealing member on each side of said liquid-filled chamber, each sealing member being positioned closely around the piston rod thereby minimizing leakage of liquid from said liquid-filled chamber during reciprocation of the piston rod;
    (c) a resilient member disposed in said liquid-filled chamber and surrounding the piston rod; and
    (d) a movable member in said liquid-filled chamber positioned to engage and compress said resilient member sealing off said liquid-filled chamber after the compressor is shut off, said movable member being activated by the residual pressure of said compressor after the compressor is shut off.

4. In a free-piston engine compressor having a piston rod connecting the reciprocating free-piston to the compressor piston, a composite seal around said piston rod comprising:
    (a) a chamber surrounding said piston rod and filled with oil pressurized by the compressor, said chamber having a movable wall for reducing the volume of said chamber, said chamber being maintained at maximum volume during reciprocation of said piston rod by the oil pressure acting against said movable wall;
    (b) a sealing member on each side of said chamber, each said sealing member being positioned closely around said piston rod thereby minimizing leakage of oil from said chamber during reciprocation of said piston rod;
    (c) a resilient member disposed in said chamber and surrounding said piston rod; and
    (d) means for urging said movable wall against said resilient member when the compressor is shut off and the oil pressure reduces thereby sealing off said chamber from said piston rod.

5. A seal construction for a lubricated reciprocating part that is slidably mounted in a frame, comprising:
    (a) a pair of contractible rings surrounding the reciprocating part;
    (b) a resilient member around the exterior surface of said contractible rings providing a seal around the exterior surfaces of said contractible rings; and
    (c) means for applying a constrictive force to said resilient ring and said contractible rings to maintain said contractible rings in contiguous relation with the reciprocating part.

6. A seal construction for a reciprocating part that is slideably mounted in a frame having a fixed location for applying lubricant to the reciprocating part, comprising:
    (a) a pair of contractible rings positioned in the frame and around the reciprocating part with the surfaces of each of said rings that are adjacent to the piston rod being tapered and being oriented so that the apex of the angle that the tapered surface forms with the reciprocating part points toward the fixed location for applying lubricant to the reciprocating part;
    (b) a resilient ring surrounding said contractible rings providing a seal around the exterior surfaces of said contractible rings;
    (c) a constrictive member surrounding said resilient ring to maintain said contractible rings in contiguous relation with the reciprocating part thereby providing a scraping action to remove lubricant from the surface of the reciprocating part during motion from the fixed location for applying lubricant toward said contractible rings and a hydrodynamic pumping action to remove lubricant from the surface of the reciprocating part during motion from said contractible rings toward the fixed location for applying lubricant.

7. In a free-piston-engine compressor having a piston rod connection between a combustion piston and a compressor piston that reciprocate within a frame, a composite seal for said piston rod comprising:
    (a) an annular ring slidably disposed in the frame and surrounding the piston rod;

(b) a variable-volume chamber disposed in the frame and surrounding the piston rod, one wall of said chamber including said annular ring, said chamber being filled with oil and maintained at maximum volume during reciprocation of the compressor by said oil which is pressurized by the compressor;

(c) at least one sealing member around the piston rod positioned on each side of said chamber for minimizing loss of oil from said chamber during reciprocation of the compressor;

(d) a resilient ring disposed in said chamber and encircling the piston rod;

(e) an enlargement on the piston rod positioned to engage said annular ring at a maximum terminal position of the piston rod moving said annular ring to compress said resilient ring thereby sealing off said chamber from the piston rod, said maximum terminal position of the piston rod occurring during shutdown of said compressor when the residual pressure of the compressor acts against the compressor piston.

8. In a free-piston-engine compressor having a piston rod connection between a combustion piston and a compressor piston that reciprocate within a frame, a composite seal for said piston rod comprising:

(a) a cylinder disposed in the frame, said cylinder surrounding the piston rod and having its central axis aligned therewith;

(b) a sealing piston disposed in said cylinder and having a central bore fitting closely around the piston rod, one end of said sealing piston forming a chamber with one end of said cylinder, and the opposite end of said sealing piston forming a relief space with the opposite end of said cylinder, said chamber being filled with oil;

(c) a spring disposed in said relief space to urge said sealing piston in a direction tending to eliminate said chamber;

(d) a connection between the compressor and said chamber to pressurize said oil and urge said sealing piston against said spring and maintain the space in said chamber;

(e) at least one sealing member around the piston rod positioned on each side of said cylinder for minimizing loss of oil from said chamber during reciprocation of the compressor; and (f) a resilient ring disposed in said chamber around the piston rod to seal off said chamber from the piston rod when the compressor is shut off reducing the pressure of the oil therein and allowing said spring to move said sealing piston compressing said resilient ring between the ends of said sealing and said cylinder.

References Cited by the Examiner

UNITED STATES PATENTS

| | | | |
|---|---|---|---|
| 1,903,210 | 3/33 | Carrier | 277—73 |
| 2,973,135 | 2/61 | Greenwald | 103—112 X |

LAURENCE V. EFNER, *Primary Examiner.*

ROBERT M. WALKER, *Examiner.*